No. 770,741.

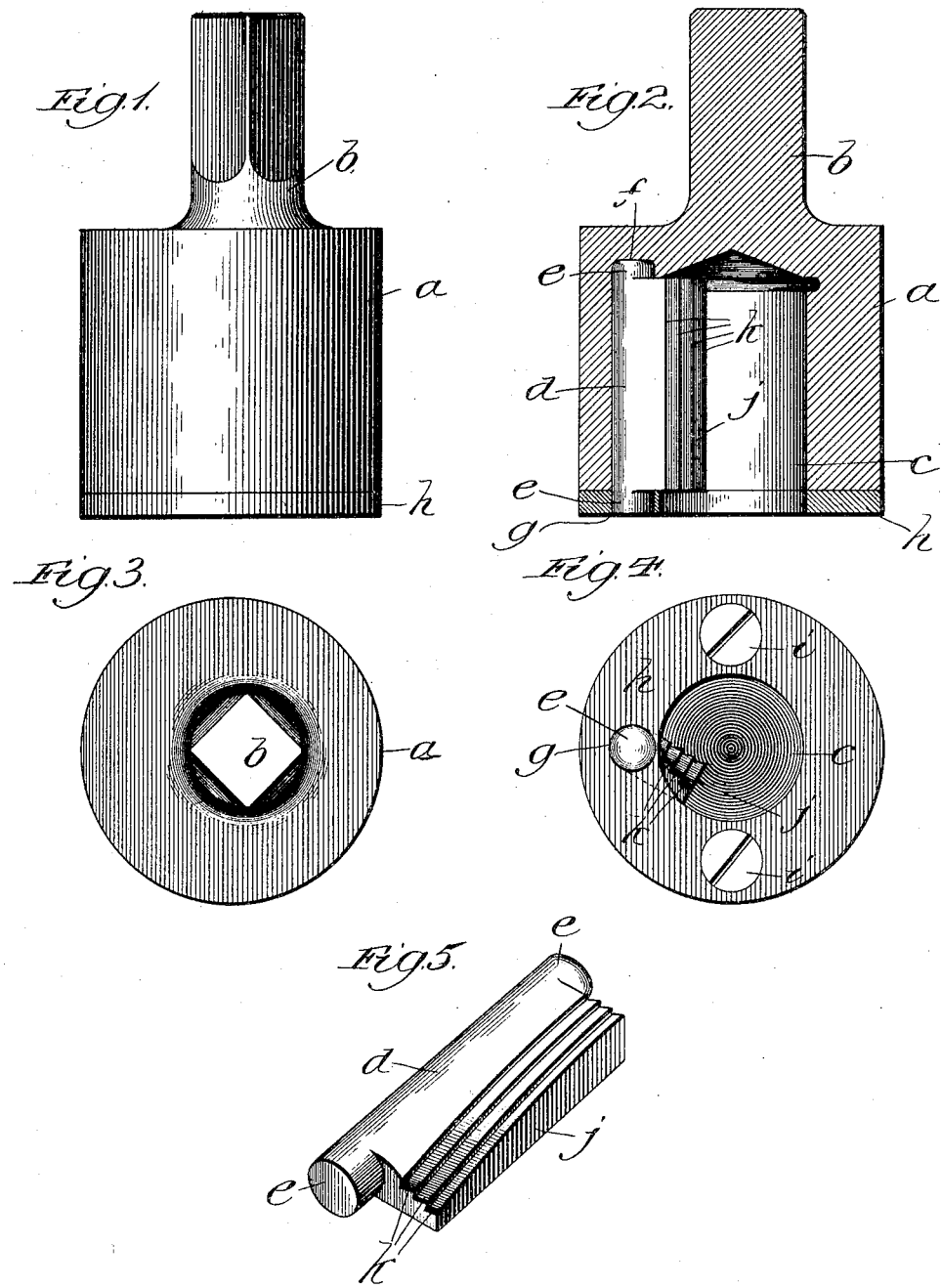

Patented September 27, 1904.

UNITED STATES PATENT OFFICE.

BENJAMIN S. DUSTIN, OF TOPEKA, KANSAS.

STAY-BOLT CHUCK.

SPECIFICATION forming part of Letters Patent No. 770,741, dated September 27, 1904.

Application filed September 18, 1903. Serial No. 173,673. (No model.)

*To all whom it may concern:*

Be it known that I, BENJAMIN S. DUSTIN, a citizen of the United States, residing at Topeka, in the county of Shawnee and State of Kansas, am the inventor of certain new and useful Improvements in Stay-Bolt Chucks, of which the following is a specification.

My invention relates to that class of stay-bolt chucks having a main body portion provided with a socket for receiving the end of the stay-bolt and having a pawl pivotally mounted at one side of such socket for engaging the stay-bolt to hold it in position therein.

The principal object of my invention is to provide a simple, economical, and efficient stay-bolt chuck.

A further object of my invention is to provide a stay-bolt chuck comprising a main body portion having a central socket and a tapering pawl pivotally mounted at one side of such socket, whereby the end of a stay-bolt when inserted in the socket will be held in fixed relation to the chuck when such chuck is rotated in one direction and immediately released therefrom when the chuck is rotated in the other direction, thus enabling the stay-bolt to be quickly placed in position in a boiler, fire-box, or other device in connection with which such stay-bolt is to be used.

A further object is to provide means whereby the squaring of the ends of stay-bolts and the weakening of such bolts by reason of the heating preparatory to squaring may be avoided.

Other and further objects of the invention will appear from an examination of the drawings and the following description and claims.

The invention consists in the features, combinations, and details of construction hereinafter described and claimed.

In the accompanying drawings, Figure 1 is a view in elevation of a stay-bolt chuck constructed in accordance with my improvements; Fig. 2, a sectional elevation taken through the center thereof, showing the pivotally-mounted tapered pawl in position; Fig. 3, a rear end view of the chuck; Fig. 4, a front end view showing the end of the tapered pawl, and Fig. 5 a perspective detail view of the tapered pawl.

In constructing a chuck in accordance with my improvements I provide a main body portion $a$, preferably of steel and having an integral shank $b$, which is here shown with a squared end, but which, of course, may be made in the ordinary tapered form, as will be readily understood by those skilled in the art. The main body portion of the chuck is bored out near the axial center, but slightly eccentric to the main body portion thereof, so as to provide a cylindrical socket $c$ of sufficient size to admit the stay-bolt to be operated upon.

It is desirable to provide means for holding the stay-bolts to be operated upon in position in the chuck in fixed relation thereto when the chuck is turning in the direction necessary to screw the stay-bolt into position and immediately release the stay-bolt when the chuck is turned in the opposite direction. To accomplish these purposes, a suitable pawl $d$ of substantially the length of the cylindrical socket of the chuck is pivotally mounted at one side of such socket—the side which is farthest from the axial center of the main body portion of the chuck and shank. This pawl is provided with end trunnions or bearings $e$, one of which enters the slot $f$ adjacent to the rear end of the main socket portion of the chuck and converging therewith. The trunnion at the other end of the pawl is rotatably mounted in the perforation $g$ in the removable collar $h$, which is mounted upon the front end of the chuck and held firmly in position by means of screws $i$. This collar is made removable for the purpose of enabling the pawl to be placed in position or to be removed and replaced by a new one when desired. The jaw $j$ of the pawl is provided with teeth $k$ and is tapered, as shown in Figs. 2, 4, and 5, so that the toothed surface thereof extends at an incline from the forward end of the chuck near the wall of the socket backward and toward the center of such socket, the rear end of the pawl being of a greater thickness than the front end. The front end of the pawl also tapers and increases in thickness from the inner edge of the jaw backward and toward the pivotal center of such pawl. The back surface of the pawl is substantially flat and when in operation rests firmly against the wall of the slot f, in which the pawl is pivotally mounted, and which slot converges with the main bore or socket portion proper of the chuck. By this arrangement it will be readily seen that the stay-bolts to be operated upon may be quickly placed in position in the socket and held in fixed relation to the chuck, so as to rotate therewith when the chuck is rotated in the desired direction and quickly released therefrom when the chuck is rotated in the opposite direction. The pawl being mounted at the side of the socket farthest from the axial center of the chuck and tapering from the front end rearward and toward the center of the socket, it will be seen that the toothed surface of the pawl is at the desired incline to enable it to efficiently hold the stay-bolts in a substantially central position with relation to the axial center of the chuck and shank and that stay-bolts of different diameters within certain limits may be efficiently operated upon by a chuck thus constructed.

It will be readily understood by those skilled in the art that this chuck is adapted to be used in connection with an air-motor, which may be of any ordinary and well-known type. The chuck being constructed as above described and placed in position to be rotated in either desired direction by means of the air-motor or other equivalent element, the stay-bolt to be operated upon is placed in the socket and having been properly threaded is rotated in the desired direction to place it in position in the walls of a boiler or in the walls of a firebox or other device in connection with which it is to be used. The stay-bolt may be quickly grasped, firmly held, and quickly released by such a chuck and may be rotated at the desired speed for any purpose without first squaring the end thereof. The necessity for heating the stay-bolt in order to enable it to be squared in the ordinary manner is thus dispensed with, and the consequent weakening of the bolt is obviated. At the same time the expense incident to squaring the ends of the bolts is dispensed with, and a suitable means for quickly and efficiently placing bolts in position or rotating them for any desired purpose is provided.

I claim—

1. In a chuck of the class described, the combination of a main body portion provided with a receiving-socket having walls adapted to engage the article to be held thereby, a pawl pivotally mounted at one side of such socket and having an inner inclined engaging surface extending backward and toward the center of the socket at an incline and adapted to engage the article to be held thereby, and means for holding such pawl in position in the chuck, substantially as described.

2. In a chuck of the class described, the combination of a main body portion provided with a receiving-socket and a pawl pivotally mounted at one side of such socket and having an inner inclined surface extending backward and toward the center of the socket and adapted to engage the article to be held thereby, substantially as described.

3. In a chuck of the class described, the combination of a main body portion provided with a receiving-socket having a rigid wall adapted to engage the article to be held thereby, a pawl pivotally mounted and having an inner edged portion extending at an incline backward and toward the center of the socket adapted to grip the article to be held thereby upon turning the chuck in one direction and to release such article when turned in the opposite direction, and means for holding such pawl in position in the chuck, substantially as described.

4. In a chuck of the class described, the combination of a main body portion provided with a socket having walls adapted to engage the article to be held thereby, a tapered pawl pivotally mounted and extending into such socket, having an inner inclined toothed surface extending backward and toward the center of the socket, a removable collar for holding such pawl in position in the chuck, and a shank for such chuck, substantially as described.

5. In a chuck of the class described, the combination of a main body portion provided with a socket extending parallel with the axial center thereof, a tapered pawl pivotally mounted adjacent to and extending into such socket and provided with a toothed surface upon the inner side thereof extending at an incline from the front end backward and toward the center of the socket, and means for holding such pawl in operative position, substantially as described.

6. In a chuck of the class described, the combination of a main body portion provided with a socket extending parallel with the axial center thereof, a tapered pawl pivotally mounted adjacent to and extending into such socket and provided with a toothed surface upon the inner side thereof extending at an incline from the front end backward and toward the center of the socket, a trunnion at each end of such pawl, means for holding the rear trunnion pivotally in the chuck, and a collar removably mounted at the end of the chuck opposite the shank provided with a perforation therein for receiving the other trunnion of the pawl and holding it pivotally in position, substantially as described.

BENJAMIN S. DUSTIN.

Witnesses:
 ALFRED CAIFETH,
 GUS MIHLEISEN.